May 11, 1965

V. SIMONI 3,182,665

PROCESS FOR PURIFYING SUGAR JUICES

Filed Feb. 15, 1962

INVENTOR.
VITTORIO SIMONI
BY *Robert A. Finch*
ATTORNEY

3,182,665
PROCESS FOR PURIFYING SUGAR JUICES
Vittorio Simoni, Milan, Italy, assignor to The Eimco Corporation, Salt Lake City, Utah, a corporation of Delaware
Filed Feb. 15, 1962, Ser. No. 173,541
1 Claim. (Cl. 127—50)

The present invention relates to a process for purifying sugar juices.

An object of the present invention is to eliminate a trouble that is frequently complained of, namely the clogging of the rotary filters for processing the first carbonation juice, on account of the presence of minute crystals of calcium carbonate. This trouble results in a sharp drop in the efficiency of the filters which has an adverse effect on the whole production process.

It will be useful to recount briefly that part of the sugar manufacturing process that is mostly closely related to the present invention.

As is known to those skilled in the art, crude sugar juice extracted by diffusion must be separated from colloidal substances such as pectin, resins and the like before passing on to the stage of concentration followed by crystallization of the saccharose. This purification is carried out with lime milk, after which saturation with carbon dioxide takes place. This stage is followed by filtration and the juice is thus freed from the coagulated colloidal substances and the calcium carbonate crystals.

As already stated, the operation of filtration on a rotary drum filter is hindered by the smallest of the calcium carbonate crystals which tend to clog the filter.

The process according to the present invention is a process for purifying sugar juices which comprises the operations of treating the crude juice with lime milk, saturating it with carbon dioxide, and filtering the saturated juice on a rotary drum filter or the like, characterized in that, on coming out of the saturator, the juice is sent to a cyclone classifier, in that the lightest fraction continuously extracted by said cyclone is re-cycled, and in that the heaviest fraction continuously extracted by said cyclone is sent directly to be filtered on a rotating drum filter or the like.

Figure 1:
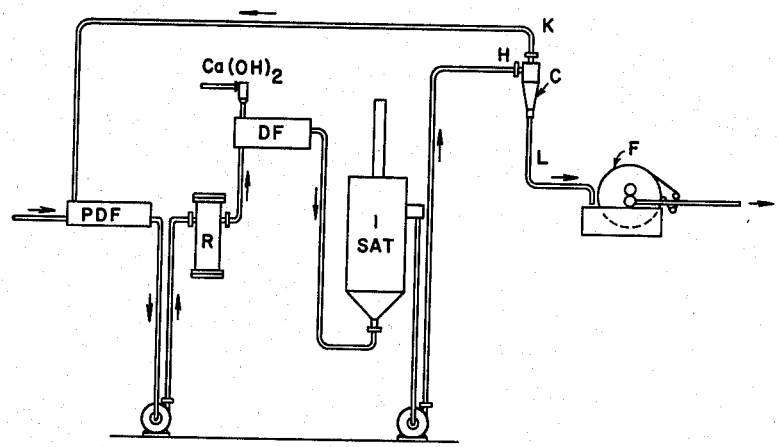
Figure 2:
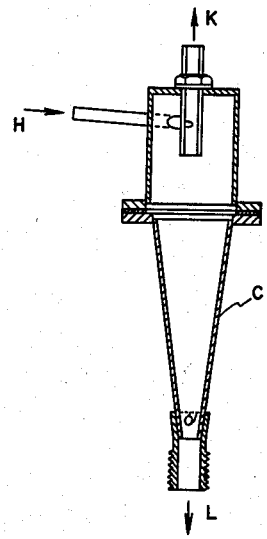

The process according to the invention will readily be understood with the aid of the accompanying drawings wherein:

FIG. 1 shows a simplified diagram of the process; and
FIG. 2 shows a detail thereof, namely a view of the cyclone separator.

With reference to the figures, it will be observed that the crude juice arrives at a predefecation reactor PDF whence it proceeds towards a heater R, passes into a defecation reactor DF, and from here to a saturator SAT 1. In the latter the first saturation with carbon dioxide takes place.

It is at this point that the improvement according to the present invention has its application, for the first saturation juice, instead of going straight away to be filtered on filter F, is sent at H to the cyclone separator C. This apparatus, shown in more detail in FIG. 2 and known in itself, classifies the juice into two fractions, a lighter one and a heavier one.

The lighter fraction, which contains the minute calcium carbonate crystals that are prone to clog the filter, is returned through K to predefecation PDR, and in this manner only only are the minute calcium carbonate crystals eliminated, but also, when they have been re-cycled, constitute starting points for the formation of new crystals. The heavy fraction goes through L to filter F.

It is manifest that the improvement according to the present invention is particularly significant when, for the filtration of first saturation juice, rotating drum filters working "in vacuo" and drawing from the slurry, such as the EimcoBelt filter described in Patent No. 605,347, or like filters, are used.

Many purification trials have been carried out and the results obtained from the invention process then compared to those obtained with the usual method. In the following examples these sets of trials will be described and, for the sake of clarity and brevity, the final end results will be disclosed.

*Example 1*

In this example we shall disclose the results of trials carried out with the usual method, that is by causing first carbonation juice to be passed directly on to a drum filter (such as the EimcoBelt). The results were referred to the coefficient $F_K$, a parameter defined in Schmidt, Technologie des Zuckers, published by Schaper Hannover, 1955, page 283. In this case, the means $F_K$ in the juice was found to be equal to 2.2 and the capacity of the filter was found to be 2.932 litres per m.$^2$ of immersed filtering surface per hour.

*Example 2*

A second set of trials was carried out by re-cycling 40% of the juice leaving the saturator back into the predefecation reactor: the results were $F_K = 1.9$–$2.0$ and the capacity of the filter was found to be 3.212 litres per m.$^2$ of immersed filtering surface per hour.

*Example 3*

The trials under the same conditions as those of the previous examples were repeated, but the cyclone classifier was inserted in the system, the light fraction extracted continuously by the cyclone being sent back to predefecation and the heavier fraction being passed to the filter, as per the invention. $F_K$ became 0.90–1.10; the capacity of the filter was 6.270 litres per m.$^2$ of immersed filtering surface per hour.

An examination of the examples will bring to light immediately the advantage of the process according to the invention: simply re-cycling (Example 2) leads to a slight improvement in the capacity of the filter as compared to that obtained with the usual process (Example 1), but it will be observed that the treatment of the first saturation juice in the cyclone classifier and the re-cycling of the light fraction to predefecation enables a filter capacity more than double that found in Example 1 and a significantly reduced $F_K$, to be obtained. The advantage is therefore demonstrated.

From the foregoing, it can be appreciated that the present invention, in its broadest form, contemplates improved juice purification by classifying saturated juice into fine and coarse fractions, and returning only fines to predefecation. The result is a coarse fraction from which purified juice is separable with facility of a magnitude enabling economic use of filtration which has been hitherto unattainable.

In a particular embodiment, the classification is effected in a hydro-cyclone which produces completely unexpected, indeed, synergistic effects. And in a further refinement, the predefecation treatment with lime in the first reaction zone is conducted in the presence of a modest quantity of carbon dioxide gas, less than that required for saturation, which further enhances the unexpected superior results obtained by employment of a hydrocyclone to carry out the classifying.

I claim:

The process of purifying sugar-bearing juice yielded from beets, comprising the steps of forming a reacted mass containing juice and precipitated solids by introducing said juice into a first reaction zone and there reacting it with a lime-bearing material to effect precipitation of discrete sized solids, thence introducing said juice and solids into a second reaction zone and there contacting the same with carbon dioxide gas, passing the resulting reacted mass through a hydrocyclone to separate said mass by centrifugal classification into a first fraction containing juice and relatively fine solids and a second fraction containing juice and the relatively coarse solids, subjecting said second fraction to vacuum filtration to separate solids therefrom, and returning at least a portion of only said first fraction including both juice and fine solids directly to said first reaction zone prior to subjecting said fraction to any further reaction.

References Cited in the file of this patent

UNITED STATES PATENTS

| | | |
|---|---|---|
| 2,774,693 | Brieghel-Muller | Dec. 18, 1956 |
| 3,089,789 | Van Note | May 14, 1963 |

FOREIGN PATENTS

| | | |
|---|---|---|
| 921,980 | Germany | Jan. 24, 1955 |

OTHER REFERENCES

Chem. Abs., vol. 52, p. 8599h; Abstracting Cukoripar 9, pp. 147–159 (1956).

Adamov: The International Sugar Journal, August 1959, page 244, column 1.